Jan. 15, 1952  H. ESCHER  2,582,626
PILOT OR RELAY VALVE
Filed Sept. 19, 1945  2 SHEETS—SHEET 1

Patented Jan. 15, 1952

2,582,626

UNITED STATES PATENT OFFICE 2,582,626

PILOT OR RELAY VALVE

Hans Escher, Wollongong, New South Wales, Australia, assignor to Australian Iron & Steel Limited, Sydney, New South Wales, Australia, a company of New South Wales Application September 19, 1945, Serial No. 617,285
In Australia November 14, 1944

1 Claim. (Cl. 277—44)

This invention relates to relay or pilot valves used on automatic regulators which are actuated by air pressure, gas or other fluid.

The present invention has been devised to provide comparatively simple means wherein the speed of regulation is governed, so that when the regulator is a considerable distance from the desired point of regulation, the speed of regulation is high; and as the desired point is approached the speed of regulation is reduced and comes to a standstill when the desired point is reached, so avoiding over-regulation and tendency to hunting. This invention is applicable to various types of controllers for the control of pressure and flow, as for example, flow ratio controllers to control air in accordance with coke oven gas flow; flow controllers to control air in accordance with blast furnace gas flow; blast furnace flow regulators which maintain a constant flow of blast furnace gas; coke oven gas flow regulators similar in function to the last described example; and coke oven gas safety regulators which cut off the coke oven gas when the pressure in the blast furnace gas is higher than that in the coke oven gas main, thereby preventing back flow of the blast furnace gas into the coke oven gas main.

The automatic regulator for blast furnaces, coke ovens and the like has associated with the control means a pilot valve consisting of a pair of valve members operated by a spindle in a valve body or the like over valve openings or seatings at opposite sides or ends of such body, and said seatings control an inlet from the main flow line or pipe or other connection and a discharge port respectively. A connection to said body from a servo motor or other unit is provided for actuating the regulating valve, and an operative connection from the valve spindle to an impulse receiving element, second servo motor or the like, for actuating said spindle.

The valves have spring means associated therewith and are adapted to float freely in the valve body over their respective seatings, with a small gap therebetween, so allowing a small quantity of air or other fluid to pass through. In this condition the two gaps are then at their minimum, and the speed of regulation is also at its minimum. When the pilot valve is thrown out of balance, one of the valve springs is deflected in accordance with the out of balance force, and the gap between the valve and its seating becomes greater as the out of balance force increases, and the speed of regulation is increased accordingly. When the desired regulated point is approached, the valves float freely and without friction in relation to the seatings and their body, so that the greatest accuracy of regulation is attained.

In order to describe the invention more fully, reference will now be made to the accompanying drawings wherein.

Figure 1:
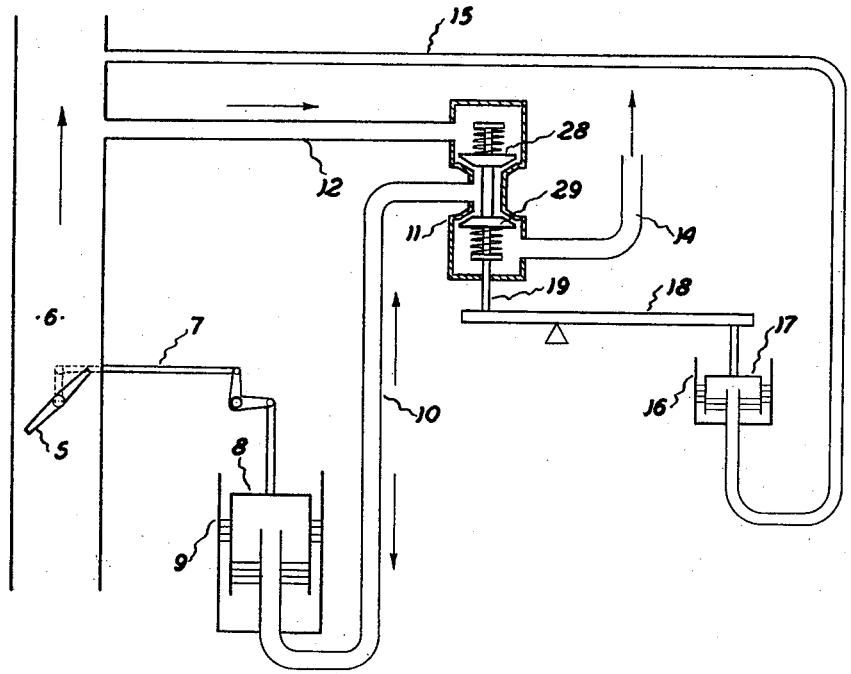
Figure 1 is a schematic layout of an automatic regulating valve system embodying one form of the invention.

The regulating valve 5 is mounted in the main supply passage 6 and connected by operative linkage 7, more or less as usual, to the bell 8 of a servo motor 9 which has a pipe connection 10 to the body 11 of the pilot or relay valve means later described. An inlet pipe or passage 12 leads to the body 11. A pump or other pressure supply or boosting source, (not shown) may be connected to the pipe 12 instead of the main supply passage 6. A discharge pipe 14 leads from the body 11 and there is also a feed passage 15 connecting to an impulse receiving element 16, constituted of a second servo motor and forming the primary controller, the bell 17 of which, is connected by an actuating arm 18 with the spindle 19 of the pilot or relay valve, now to be described in detail.

The above described layout may be all more or less as usual, and the fluid used to operate the servo-motor 9 and the impulse receiving element 16 is taken from the main 6, the pressure in which is being regulated. The operating fluid can also be supplied by an outside source.

The pilot or relay valve consists of a body 11 with an inlet chamber 20 to which an inlet pipe 12 is connected, and there is a sideward branch 21, the bore of which is preferably tapered inwardly, leading to a spindle compartment 22 flanked by valve openings 23 and 24, the outer faces of which form seatings 25 and 26 with a gap therebetween. The branch 21 has a pipe 10 from the servo motor 9 connected thereto.

The valve spindle 19 being positioned more or less centrally, and free to move upwards and downwards without friction, has a medially enlarged stem portion 27, with shoulders 27A. The length of the stem portion 27 is a little greater than the distance between the valve seatings 25 and 26. The end portions of said spindle 19 are reduced and screwed towards the extremities, and an inlet valve 28 and exhaust valve 29, each with a boss 30 on the outer face, with a tapered bore passage 31, are slidably and freely mounted on the respective reduced spindle ends, and have pressure springs 32, taking at one end thereupon, and at the other end taking about a retaining collar 33 screwed upon the said spindle ends and retained in place by locking nuts 34. The actuating arm 18 is rigidly affixed to the outer spindle end and the nut 34.

Figure 3:
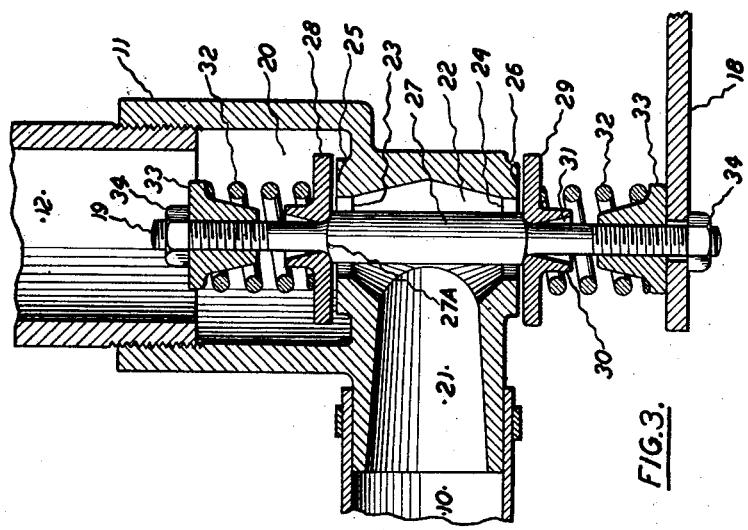
Figures 2 and 3 are sectional elevations of a preferred construction of the relay or pilot valve, showing it in the large out-of balance position, and floating or small out-of balance position respectively.
Figure 2:
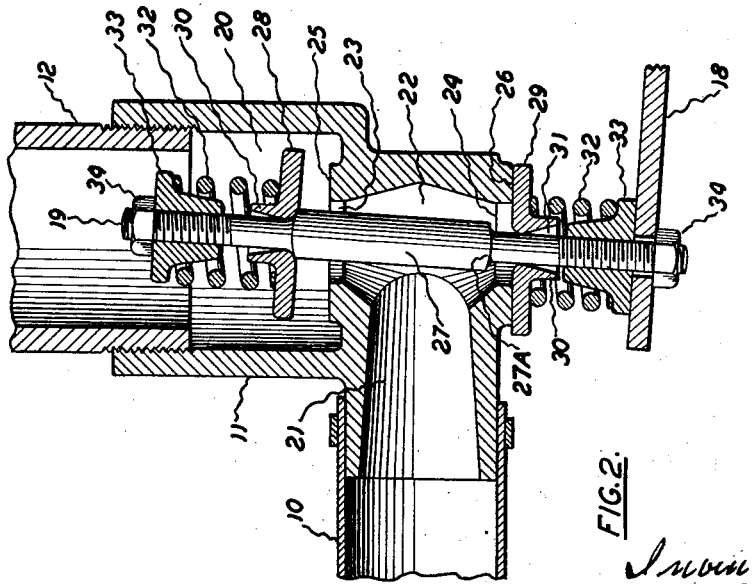

In operation (see Figures 1, 2 and 3), when the desired regulating point is maintained, the valve spindle 19 and the inlet and exhaust valves 28 and 29 float freely in the valve body, with the said valves over their respective seatings 25 and 26, and spaced therefrom by a small gap which allows only a small quantity of air or the like to pass the top and/or bottom gaps. These gaps are then at their minimum and the speed of regulation is also at its minimum. It will be seen from the drawings that the springs 32 control the respective valves 28 and 29 and regulate the extent of the gap.

With increasing out of balance force, as say, due to pressure in the main 6 decreasing, the impulse receiving element or primary regulator 16, through the depression of its bell 17, pulls down the actuating arm 18 at one end, thus elevating the other end of said arm 18, and thrusting the valve spindle 27 upwardly, closing the exhaust valve 29 and opening the inlet valve 28, thus allowing pressure to flow from the line 12 to the servo-motor 9, thereby resulting in increased speed of operation, and opening the regulating valve 5.

As the primary regulator or impulse receiving element 16 approaches balanced condition, the spindle 19 is lowered as the actuating arm 18 is depressed at that end, gradually reducing the gap of the inlet valve 28, and so decreasing the speed of operation of the servo-motor 9.

In the case of out of balance effect due, say, to increase of pressure in the main 6, the impulse receiving element 16 elevates one end of the actuating arm 18, thus depressing its other end and so pulling down the valve stem 27, closing the inlet valve 28 and opening the exhaust valve 29. Pressure under the servo-motor 9 is thus released and the regulating valve 5 closes. As a balanced effect is approached, the impulse receiving element 16 gradually restores the valve spindle 19 to the floating position.

It will be seen from the drawings that the maximum exhaust gap is fixed by the clearance between the valves 28 and 29, while the maximum inlet gap is fixed by clearance between the collars 33. The length of the spindle enlargement 27 between its ends or shoulders also fixes the minimum gap.

Due to the small gaps between the valves and their seatings, the valves are responsive to immediate opening of either the inlet or exhaust ports by a minute out of balance force. When the valve is in balance the small amount of pressure entering the inlet valve opening 23 through the gap, and at greater pressure than that in the pipe connection 10 and under the bell 8 of servo-motor 9, exhausts through the outlet valve opening 24 and through the gap at the same pressure, and at the same time, the pressure in pipe 10 remains constant.

Instead of the pipe 12 being connected to a pressure supply or boosting source as before described, it may be connected to an exhaust or suction element (not shown), and when the pressure in the main 6 decreases, valve 28, which now becomes the exhaust valve, opens, thereby closing the inlet valve and increasing the vacuum under the bell 8 which is suspended by a counterweight. In consequence, the bell is pulled down, and through the linkage 7, it opens the regulating valve 5 which is set opposite to the position shown in the drawings.

When the pressure in the main increases, the valve 29, which now becomes the inlet valve, opens, thereby closing the exhaust valve and allowing air at atmospheric pressure to enter and pass through the pipe 10, thereby decreasing the vacuum under the bell 8. By virtue of the counterweight the bell rises, and through the linkage 7, the regulating valve 5 is closed.

I claim:

A pilot or relay valve comprising a body having a compartment therein, an inlet to said compartment, an outlet from said compartment, an opening to provide communication between the compartment and a servo-motor or other regulating valve control, an annular valve seating at said inlet, an annular valve seating at said outlet co-axial with and oposed to the inlet valve seating, a valve spindle extending through said compartment and having reduced diameter ends externally of said compartment forming shoulders adjacent to said valve seatings, a valve element having a tapered hole therethrough and slidably fitted on each reduced diameter end of the valve spindle with the smaller end of the tapered hole adjacent to the related shoulder of the spindle which provides an abutment for said valve element, a collar screwed on each end of the valve spindle, a compression spring located between each collar and valve element to bias each valve element towards its valve seating, and an actuating arm secured to the valve spindle at one end.

HANS ESCHER.

REFERENCES CITED

The following references are of record in the file of this patent:

UNITED STATES PATENTS

| Number | Name | Date |
|---|---|---|
| 148,565 | Jones | Mar. 17, 1874 |
| 1,992,048 | Temple | Feb. 19, 1935 |
| 2,082,512 | Richardson | June 1, 1937 |
| 2,286,873 | Swartz | June 16, 1942 |
| 2,297,361 | Mallory | Sept. 29, 1942 |

FOREIGN PATENTS

| Number | Country | Date |
|---|---|---|
| 218,506 | Great Britain | of 1924 |
| 793,316 | France | of 1935 |